United States Patent
Paganelli (10) Patent No.: US 10,153,500 B2
(45) Date of Patent: Dec. 11, 2018

(54) FUEL CELL AND METHOD FOR STOPPING A FUEL CELL

(75) Inventor: Gino Paganelli, Cottens (CH)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1156 days.

(21) Appl. No.: 13/505,284

(22) PCT Filed: Oct. 27, 2010

(86) PCT No.: PCT/EP2010/066259
§ 371 (c)(1),
(2), (4) Date: Jul. 12, 2012

(87) PCT Pub. No.: WO2011/051338
PCT Pub. Date: May 5, 2011

(65) Prior Publication Data
US 2012/0308906 A1    Dec. 6, 2012

(30) Foreign Application Priority Data
Oct. 30, 2009    (FR) ..................................... 09 57644

(51) Int. Cl.
*H01M 8/04*    (2016.01)
*H01M 8/10*    (2016.01)
(Continued)

(52) U.S. Cl.
CPC ..... *H01M 8/04097* (2013.01); *H01M 8/0491* (2013.01); *H01M 8/04201* (2013.01);
(Continued)

(58) Field of Classification Search
None
See application file for complete search history.

(56) References Cited

U.S. PATENT DOCUMENTS 5,178,969 A  *  1/1993  Amemiya ......... H01M 8/04029
                                                     429/437
6,939,633 B2    9/2005  Goebel
                         (Continued)

FOREIGN PATENT DOCUMENTS

EP    1 487 044    12/2004
FR    2 917 536    12/2008
                (Continued)

*Primary Examiner* — Jonathan Crepeau
*Assistant Examiner* — Angela J Martin
(74) *Attorney, Agent, or Firm* — Cozen O'Connor (57) ABSTRACT

The fuel cell stack (1) may be supplied with oxygen or with atmospheric air as oxidant gas. The fuel cell stack includes a device for filling with pressurized atmospheric air comprising an air intake orifice (126), an oxidant gas recycling loop (12R) and apparatus for isolation from the atmospheric air, such as an isolation valve (128), a cut-off valve (120) or a non-return valve, enabling the supply channel to the cathodes and said recycling loop to be isolated from the atmospheric air. This makes it possible to implement a shut-down procedure comprising the following actions: (i) the supply of fuel gas and oxidant gas is cut off; (ii) current continues to be drawn so as to consume the oxidant gas remaining in the oxidant gas supply system; and (iii) nitrogen-enriched gas is injected into the oxidant gas supply system. Upon being shut down, the fuel cell stack is under conditions preventing degradation thereof by shutting down the internal electrochemical processes so as to guarantee that a hydrogen/nitrogen mixture remains in the fuel cell stack after it has been extinguished.

5 Claims, 6 Drawing Sheets

(51) Int. Cl.
  *H01M 8/04089* (2016.01)
  *H01M 8/04228* (2016.01)
  *H01M 8/04082* (2016.01)
  *H01M 8/04223* (2016.01)
  *H01M 8/0444* (2016.01)
  *H01M 8/04537* (2016.01)
  *H01M 8/04664* (2016.01)
  *H01M 8/04746* (2016.01)
  *H01M 8/04858* (2016.01)
  *H01M 8/1018* (2016.01)
  *H01M 8/1007* (2016.01)

(52) U.S. Cl.
  CPC ... *H01M 8/04228* (2016.02); *H01M 8/04231* (2013.01); *H01M 8/04447* (2013.01); *H01M 8/04552* (2013.01); *H01M 8/04559* (2013.01); *H01M 8/04671* (2013.01); *H01M 8/04753* (2013.01); *H01M 8/1007* (2016.02); *H01M 2008/1095* (2013.01)

(56) References Cited

U.S. PATENT DOCUMENTS

| | | | |
|---|---|---|---|
| 2002/0076583 A1* | 6/2002 | Reiser | H01M 8/04223 429/429 |
| 2003/0039869 A1 | 2/2003 | Murakami et al. | |
| 2004/0124843 A1 | 7/2004 | Hamada | |
| 2005/0064252 A1 | 3/2005 | Kusakabe | |
| 2006/0228601 A1* | 10/2006 | Yoshida | H01M 8/04231 429/415 |
| 2007/0154742 A1* | 7/2007 | Tang | H01M 8/04223 429/423 |
| 2007/0193340 A1* | 8/2007 | Yoshida | H01M 8/04231 73/46 |
| 2008/0038595 A1 | 2/2008 | Buchi | |
| 2008/0176127 A1* | 7/2008 | Rogahn | H01M 8/04231 429/429 |
| 2008/0311439 A1* | 12/2008 | Paganelli | H01M 8/04164 429/415 |
| 2009/0220832 A1 | 9/2009 | Reiser et al. | |
| 2010/0068578 A1 | 3/2010 | Katano | |

FOREIGN PATENT DOCUMENTS

| | | | |
|---|---|---|---|
| GB | 2 453 126 | 4/2009 | |
| JP | 03-081970 | * 4/1991 | ............ H01M 8/04 |
| JP | H03 81970 | 4/1991 | |
| JP | 2007-534108 | 11/2007 | |
| JP | 2008-507103 | 3/2008 | |
| JP | 2008-293761 | 12/2008 | |
| JP | 2009-211837 | 9/2009 | |
| WO | WO 2005/088756 | 9/2005 | |
| WO | WO 2006/012954 | 2/2006 | |
| WO | WO 2008 081979 | 7/2008 | |

\* cited by examiner

FUEL CELL AND METHOD FOR STOPPING A FUEL CELL

RELATED APPLICATIONS

This is a U.S. national stage of application No. PCT/EP2010/066259, filed on 27 Oct. 2010. Priority is claimed on France Application No. 09/57644 filed 30 Oct. 2009, the content of which is hereby incorporated by reference.

FIELD OF THE INVENTION

The present invention relates to fuel cell stacks, in particular, but not exclusively, to fuel cell stacks of the type having an electrolyte in the form of a polymeric membrane (i.e. of the PEFC (Polymer Electrolyte Fuel Cell) type).

BACKGROUND OF THE INVENTION

It is known that fuel cell stacks produce electrical energy directly via an electrochemical redox reaction using hydrogen (the fuel) and oxygen (the oxidant) without passing via a mechanical energy conversion step. This technology seems promising, especially for motor vehicle applications. A fuel cell stack comprises in general the series combination of unitary elements each consisting essentially of an anode and a cathode separated by a polymeric membrane allowing ions to pass from the anode to the cathode.

Insufficient supply of hydrogen ($H_2$ starvation) is known to be a major cause of catalyst degradation in fuel cells of the PEFC type. Insufficient supply of hydrogen must absolutely be avoided during operation so as to prevent corrosion of the carbon generally used as catalyst support for PEFCs, but according to the inventor's experience it is also necessary to guarantee the presence of hydrogen at the anode during the phase of shutting down the fuel cell stack and while the fuel cell stack is at rest.

In general, a fuel cell stack is extinguished by extending the normal electrochemical reaction of the fuel cell stack until the voltage has collapsed due to complete consumption of at least one of the residual gases. To limit the abovementioned degradation mechanisms, it is necessary to ensure that the oxygen is exhausted before the hydrogen. It is therefore necessary to ensure that the fuel cell stack is supplied with hydrogen at the anode until complete extinction.

It is also necessary to guarantee the presence of hydrogen at the anode during rest, so as to maintain it at a 0 V RHE electrochemical potential (RHE being the abbreviation for reference hydrogen electrode). A voltage expressed in V RHE is therefore an electrochemical potential relative to that of hydrogen. Since pure hydrogen is not recommended for safety reasons, a hydrogen/nitrogen mixture is therefore recommended for the rest phases.

To guarantee the presence of hydrogen at the anode during the shut-down phases, patent application WO 06/012954 proposes purging the excess oxygen to atmosphere. However, to do this it is necessary for the cathode pressure to be high enough, something which may not always be guaranteed. Moreover, at the end of this procedure, during which air is naturally drawn in by the reduced pressure, the residual pressure in the cathode circuit is at most equal to the atmospheric pressure. By cooling, the pressure will tend to fall below atmospheric pressure, thereby increasing the migration of air into the fuel cell stack, the oxygen content of which will react with the residual hydrogen thus contributing to rapid hydrogen starvation.

Document U.S. Pat. No. 6,939,633 proposes a device for generating pressurized nitrogen from the ambient air. To do this, it is proposed to use a reactor in the cathode circuit in which the oxygen of the air introduced into the fuel cell stack by means of a pressure source is made to react with hydrogen coming from the main tank. However, no arrangement is provided for preventing hydrogen starvation. On the contrary, the proposed procedure provides for the fuel cell stack to be left with air present at the anode and at the cathode (column 8, lines 29-31). Moreover, this solution is complicated and requires the addition of a catalytic reactor in the cathode circuit. Even though the possibility of using the catalyst already present in the fuel cell stack is mentioned (column 7, lines 59-64), in both cases the hydrogen and the oxygen of the air react directly on a catalyst generating no electricity, only heat. Finally, this solution requires two communications between the anode circuit and the cathode circuit, a first valve (344) for introducing hydrogen to the cathode, so as to react with the oxygen of the air, and a second valve (346) for inundating the anode with the nitrogen generated at the cathode, thereby compromising safety in the event of one of these valves failing (inopportune opening or leakage).

Patent application US 2009/0220832 proposes a fuel cell stack comprising a hydrogen buffer tank, a recirculation loop to the cathode, and valves for isolating the internal circuits of the stack from the atmospheric air. This application demonstrates the importance of preventing hydrogen starvation during extinction and during the rest period that follows, so as to prevent long-term electrode oxidation. However, the extinction procedure described transiently involves hydrogen/oxygen mixtures, thereby compromising safety. Moreover, the proposed arrangement of the components and the procedure described are intended to inundate the circuits of the stack with practically pure hydrogen rather than with a nitrogen-hydrogen mixture, which is neither safe nor economic.

SUMMARY OF THE INVENTION

One object of the present invention is to succeed in keeping a fuel cell stack under conditions that avoid degradation thereof during shut-down and also to provide a process for shutting down the fuel cell stack in a controlled and rapid manner, that is to say a way of shutting down the internal electrochemical processes so as to guarantee that a hydrogen/nitrogen mixture remains present in the fuel cell stack after the extinction thereof, and to do so without greatly complicating the installation or compromising safety.

An embodiment of the invention relates to a fuel cell stack formed by a stack of electrochemical cells each having an anode and a cathode on either side of a polymeric ion exchange membrane, a fuel gas supply system on the anode side of the electrochemical cells and an oxidant gas supply system on the cathode side of the electrochemical cells, the fuel gas supply system comprising a cut off valve for connection to a fuel gas storage tank, a supply channel to the anodes and a fuel gas recycling loop.

An embodiment of the invention relates to a fuel cell stack in which the oxidant gas supply system for the fuel cell stack comprises an oxidant gas supply channel to the cathodes and an oxidant gas recycling loop. The present invention applies equally well to a fuel cell stack designed to operate with pure oxygen or a very oxygen-rich gas and to a fuel cell stack designed to operate with atmospheric air as oxidant gas and, even in that case, the fuel cell stack according to the invention includes such an oxidant gas recycling loop.

An embodiment of the invention relates to a fuel cell stack formed by a stack of electrochemical cells each having an anode and a cathode on either side of a polymeric ion-exchange membrane, a fuel gas supply system on the anode side of the electrochemical cells and an oxidant gas supply system on the cathode side of the electrochemical cells, the fuel gas supply system comprising:

a cut-off valve for connection to a fuel gas storage tank and a pressure regulating valve for said fuel gas;
  a supply channel to the anodes;
  a fuel gas recycling loop terminating in the supply channel downstream of the pressure regulating valve for said fuel gas;
  a supply channel for supplying the cathodes with oxidant gas;
  an oxidant gas recycling loop;
  a device for filling with pressurized atmospheric air; and
  means of isolation from the atmospheric air, enabling the supply channel to the cathodes and said recycling loop to be isolated from the atmospheric air, The fuel cell stack being characterized in that the oxidant gas supply system includes a buffer tank for accumulating said fuel gas, which is connected to the network of fuel gas supply channels, downstream of the cut-off valve and upstream of the pressure regulating valve. Thus, an arrangement for the fuel cell stack according to an embodiment of the invention makes it possible for the contents of the fuel gas buffer tank to be discharged in a finely controlled manner. The additional accumulation chamber for the fuel gas is placed at the point where the pressure in the supply circuit is highest, so as to lessen the volume thereof or, for the same volume, so as to stock a larger amount of hydrogen.

According to one aspect of the invention, the supply system includes a device for filling with pressurized atmospheric air. By this is meant that, in all the embodiments of the invention, that is to say both for a fuel cell stack designed for operating with pure oxygen or a very oxygen-rich gas and a fuel cell stack designed to operate with atmospheric air as oxidant gas, the atmospheric air is compressed before being sent into the oxidant gas supply channel terminating in the cathodes.

The device for filling with pressurized atmospheric air comprises for example the following main components: a line starting with an air intake orifice and, installed on said line, a cut-off valve and a booster pump or compressor, the line terminating in the oxidant gas supply circuit, which itself terminates in the fuel cell stack 1.

According to another aspect of the invention, means of isolation from the atmospheric air are again provided, enabling the supply channel to the cathodes and said recycling loop to be isolated from the atmospheric air. These means of isolation from the atmospheric air comprise at least one isolating valve, which isolates said filling device from the atmospheric air. More generally, these means of isolation from the atmospheric air are provided by non-return valves that have to be placed upstream and downstream of the cathode circuit so as to isolate the cathode circuit from the ambient medium, that is to say in general from the atmospheric air.

According to yet another aspect of the invention, the oxidant gas supply system further includes a connection of the supply channel to an oxygen storage tank or to a system for supplying pressurized or unpressurized atmospheric air and, on said connection, a cut-off valve forming part of the means of isolation from the atmospheric air.

Another embodiment of the invention relates to a procedure for shutting down a fuel cell stack, the fuel cell stack being formed by a stack of electrochemical cells each having an anode and a cathode on either side of a polymeric ion-exchange membrane, the fuel cell stack having a fuel gas supply system on the anode side of the electrochemical cells and an oxidant gas supply system on the cathode side of the electrochemical cells, the fuel cell stack delivering an electrical voltage to an electrical power line, the shut-down procedure comprising the following actions:

(i) the supply of fuel gas and oxidant gas is cut off;
  (ii) current continues to be drawn as long as an appropriate indicator indicates that the oxidant gas in the oxidant gas supply system has not been sufficiently consumed; and
  (iii) nitrogen-enriched gas is injected into the oxidant gas supply system.

The actions (i), (ii) and (iii) could all be concomitant. To make the following description better understood, the actions (ii) and (iii) are successive steps, the two actions (i) and (ii) being concomitant. It is also useful to provide, after the action (iii), a fuel gas suction step, as is also shown in the description of the shut-down procedure illustrating the invention.

By virtue of the shut-down procedure according to the invention, the hydrogen diffuses into the cathode only very slowly through the polymeric ion-exchange membrane and after extinction, that is to say after all the oxygen has been consumed and the cathode circuit has been filled with nitrogen. Oxygen and hydrogen therefore never cohabit in significant amount. The hydrogen supply is interrupted right from the start of the procedure simultaneously or almost simultaneously with the cutting-off of the oxidant gas supply. Although the action of interrupting the fuel gas supply could be somewhat delayed relative to the action of interrupting the oxidant gas supply, it may not be significantly delayed. The following description is limited only to the case in which the supply of oxidant gas and the supply of fuel gas are interrupted simultaneously, which is the simplest procedure to control and gives entirely satisfactory results. All the residual hydrogen at the anode is parsimoniously used to guarantee the desired $H_2/N_2$ mixture.

It should be noted that the shut-down procedure proposed above extends to a fuel cell stack in which the additional fuel gas accumulation chamber could be placed at any point in the fuel gas supply circuit, that is to say at any point between the cut-off valve and the fuel cell stack, even in the recycling circuit, or in the circuit between the water separator and the ejector. However, it is advantageous to place it at a point in the circuit where the pressure is highest so as to reduce the volume thereof, as specified in the description of the above fuel cell stack.

As regards the electrolyte, the invention applies to fuel cell stacks of the type having an electrolyte in the form of a polymeric membrane (that is to say one of the PEFC type). The insufficient supply of hydrogen is a problem to which PEFCs are quite sensitive. Furthermore, supplying the fuel cell stack with pure oxygen rather than with atmospheric air offers a number of advantages, especially a more dynamic response of the fuel cell stack to a current demand, which is particularly beneficial for applications in transport vehicles, such as motor vehicles, which are known to require particularly intermittent operating conditions, unlike steady-state applications. The fuel cell stack and the shut-down procedure described below prove to be particularly suitable for being installed and implemented in a motor vehicle.

BRIEF DESCRIPTION OF THE DRAWINGS

The rest of the description serves to make all the aspects of the invention clearly understood by means of the appended drawings in which.

DESCRIPTION OF THE PREFERRED EMBODIMENTS OF THE INVENTION

For safety reasons, fuel cell stacks are generally equipped with an $H_2$ cut-off valve which remains closed during shut-downs. In this case, it is not possible to draw $H_2$ into the tank during the extinction procedure. The shut-down procedure must therefore be carried out with only the residual hydrogen in the channels, ducts, internal dehumidifying reservoirs and other components of the supply line going from the safety valve to the actual fuel cell stack, these components being denoted hereafter in general as the supply circuit for the fuel cell stack.

Figure 1:
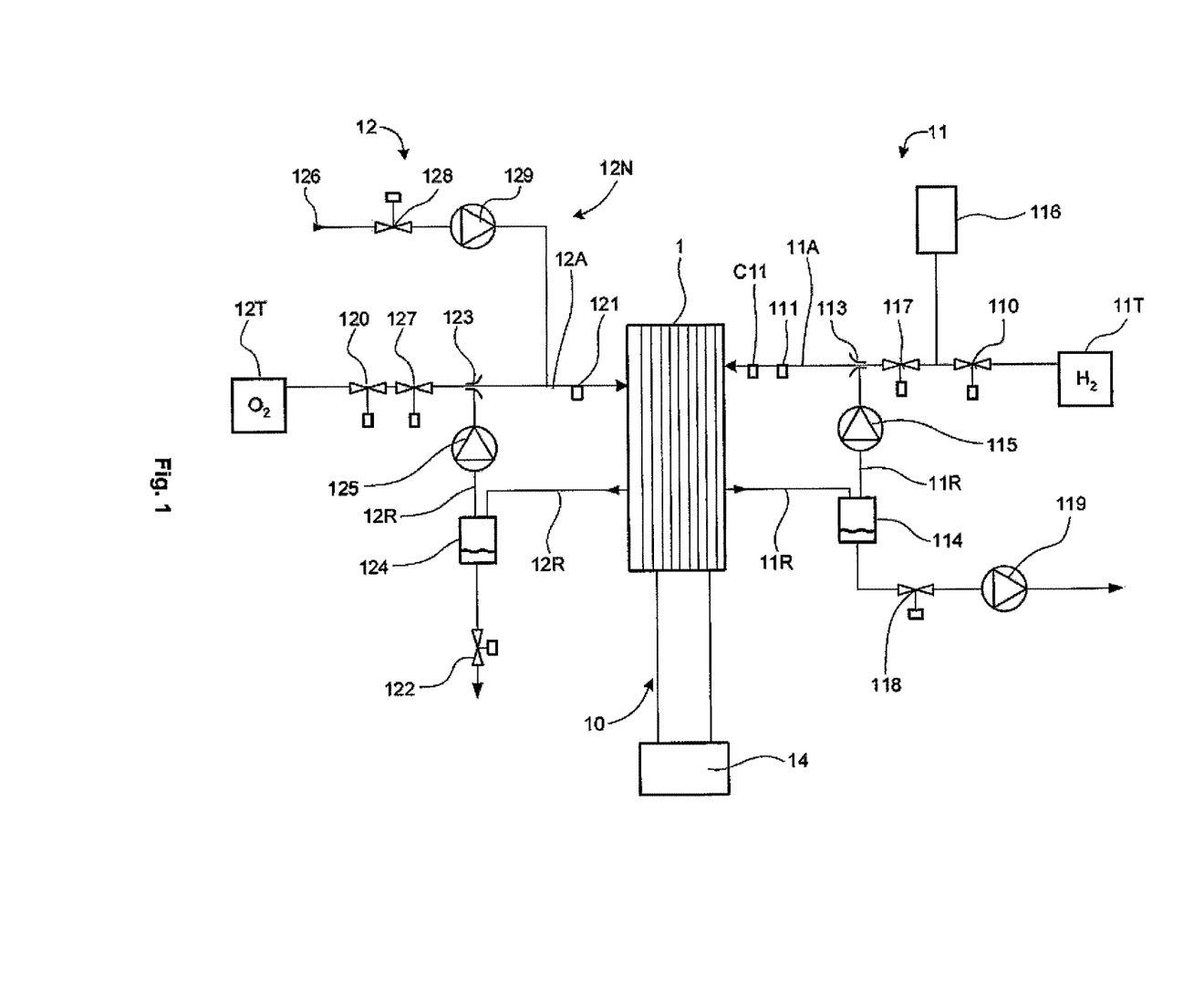
FIG. 1 is a diagram of a fuel cell stack according to an embodiment of the invention, supplied with pure oxygen.

FIG. 1 shows a fuel cell stack 1 of the type having an electrolyte in the form of a polymeric membrane (i.e. of the PEFC or PEM (proton exchange membrane) type). The fuel cell stack 1 is supplied with two gases, namely the fuel (hydrogen stored or generated on board the vehicle) and the oxidant (pure oxygen), which gases supply the electrodes of the electrochemical cells. An electrical load 14 is connected to the fuel cell stack 1 via an electrical line 10. To simplify matters, FIG. 1 shows only the gas circuit components useful for understanding the invention.

Description of the Anode Circuit

The installation comprises a fuel gas supply circuit 11 on the anode side. A pure hydrogen ($H_2$) tank 11T is visible, this being connected to the inlet of the anode circuit of the fuel cell stack 1 by means of a supply line that passes via a cut-off valve 110, then via a pressure regulating valve 117, then via an ejector 113 and then via a fuel gas supply channel 11A terminating at the anodes. A pressure probe 111 is installed in the supply channel 11A just before the inlet into the fuel cell stack 1. Forming part of the hydrogen (fuel) supply circuit 11 is a circuit 11R for recycling the hydrogen not consumed by the fuel cell stack, said circuit being connected to the outlet of the anode circuit of the fuel cell stack 1. A water separator 114 is installed in the recycling circuit 11R. The ejector 113 and a recirculating pump 115 recycle the unconsumed hydrogen and mix it with fresh hydrogen coming from the tank.

An additional fuel gas accumulation chamber 116 is also visible, this being placed on the piping of the fuel gas supply circuit 11, between the cut-off valve 110 and the pressure regulating valve 117. The additional accumulation chamber is, in this preferred embodiment, placed at the point where the pressure is highest in the supply circuit, so as to lessen the volume thereof or, for the same volume, to stock a larger amount of hydrogen. It should be noted that the additional fuel gas accumulation chamber 116 could be placed at any point in the fuel gas supply circuit, that is to say at any point between the cut-off valve 110 and the fuel cell stack 1, even in the recycling circuit 11R or in the circuit between the water separator 114 and the ejector 113. However, it is advantageous to place it at a point in the circuit where the pressure is highest, so as to reduce the volume thereof. Moreover, the position upstream of the pressure regulating valve makes controlled discharge from said accumulation chamber possible.

A suction pump 119 and a cut-off valve 118 that are installed on a line venting to atmosphere and connected to the fuel gas recycling loop 11R, preferably below the water separator 114, can also be seen. The connection at this precise point, shown in FIG. 1, makes it possible, by controlling the cut-off valve 118, to provide three functions, namely water discharging, purging and hydrogen suction. However, this embodiment detail is not limiting. To provide the more specific hydrogen suction function of the present invention, the line having the cut-off valve 118 could be connected to any point downstream of the pressure regulating valve 117.

Description of the Cathode Circuit

The installation also includes an oxidant gas supply circuit 12 on the cathode side. A pure oxygen ($O_2$) tank 12T is visible, this being connected to the inlet of the cathode circuit of the fuel cell stack 1 by means of a supply line that passes via a cut-off valve 120, then via a pressure regulating valve 127, then via an ejector 123 and then via an oxidant gas supply channel 12A terminating in the cathodes. A pressure probe 121 is installed in the supply channel 12A just before the inlet into the fuel cell stack 1. Forming part of the oxygen supply circuit 12 is a circuit 12R for recycling the oxygen not consumed by the fuel cell stack, connected to the outlet of the cathode circuit of the fuel cell stack 1. A water separator 124 is installed in the recycling circuit 12R. The ejector 123 and a recirculating pump 125 recycle the unconsumed oxygen and mix it with fresh oxygen coming from the tank.

A purge valve 122 is connected to the bottom of the water separator 124. This valve thus provides two functions, removal of the water and venting of the oxygen circuit to atmosphere. As a variant, this purge valve 122 could be connected just at the gas outlet of the fuel cell stack 1, branched off the line between the fuel cell stack 1 and the water separator 124, if it is desired to vent the oxygen circuit to atmosphere independently of draining the water in the water separator 124. It goes without saying that, in all cases, the function of draining water from the water separator 124 and from the water separator 114 must be ensured.

The fuel cell stack according to the invention includes a filling device 12N, for filling the cathode circuit with pressurized atmospheric air. The filling device 12N comprises the following components: a line starting with an air intake orifice 126 and, installed on said line, a cut-off valve 128 and a booster pump 129, the line terminating in the oxygen supply circuit, just upstream of the fuel cell stack 1. We should point out that the atmospheric air filling device 12N could terminate at any point in the loop of the oxidant gas supply circuit 12, said loop being formed by the recycling circuit 12R and by the line connecting the ejector 123 to the fuel cell stack 1.

Figure 2:
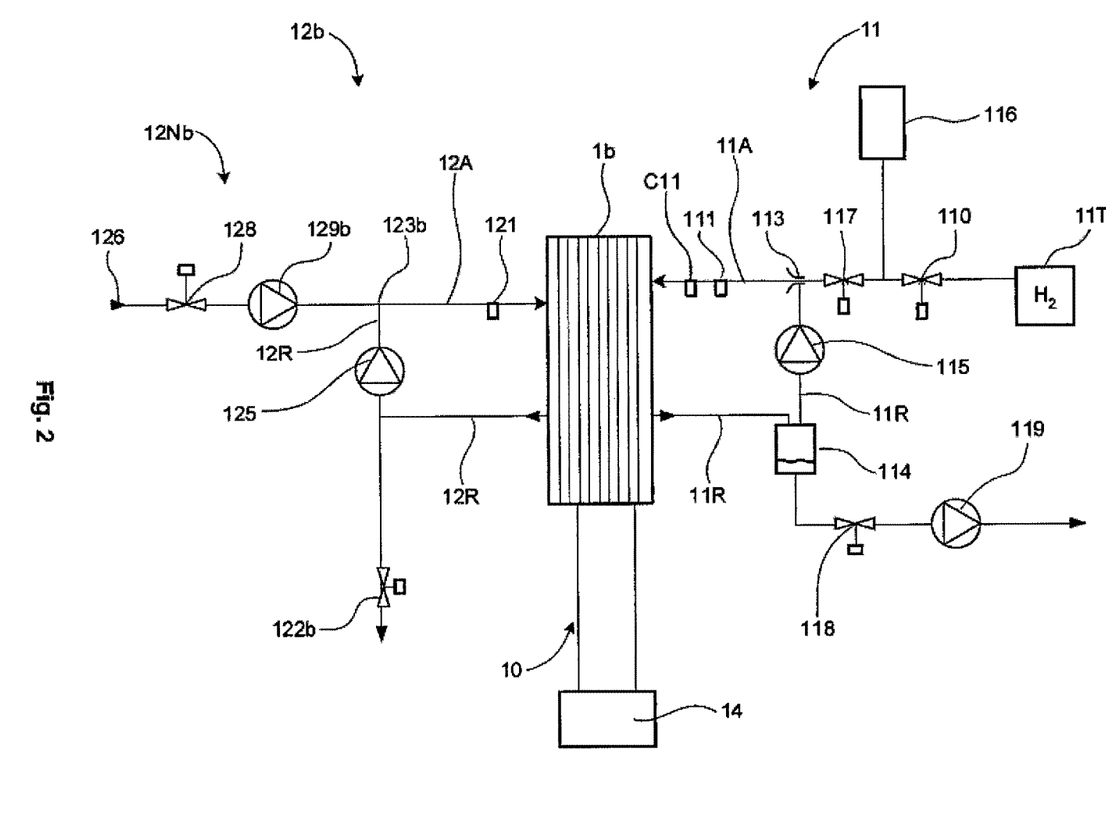
FIG. 2 is a diagram of a fuel cell stack according to an embodiment of the invention, supplied with ambient air.

FIG. 2 shows a fuel cell stack 1b different from that of FIG. 1 in that the oxidant gas this time is the atmospheric air. To simplify matters, FIG. 2 shows only the gas circuit components useful for understanding the invention. The fuel gas supply system is identical to that of FIG. 1. Consequently, it is unnecessary to repeat the description thereof, and the references used are common to those of FIG. 1.

As regards the oxidant gas supply circuit 12b on the cathode side, a first notable difference is the absence of connection to a pressurized oxygen tank. A device 12Nb for filling with pressurized atmospheric air can be seen that is very similar to that of 12N of FIG. 1. This device comprises an air compressor 129b which, incidentally, in the context of the invention, is used as booster pump (like the booster pump 129 of FIG. 1) serving in normal usage for supplying the fuel cell stack with atmospheric air. In the context of this invention, the compressor 129b is used as booster pump. It is assumed here that the compressor is capable of providing the two functions of supplying the fuel cell stack with air during normal operation and of boosting with pressurized air during extinction. It should be noted that if the air compressor cannot provide the booster pump function for example for pressure level incompatibility reasons, a second line for filling with pressurized air would then be provided, used only during extinction. Another difference is that the circuit 12R for recycling the air not consumed by the fuel cell stack is directly connected to the supply channel 12A without passing via an ejector, via a simple branch connection 123b downstream of the device 12N for filling with pressurized atmospheric air. Another difference is that the recycling circuit 12R does not include a water separator. A pressure regulating valve 122b controlling the pressure drop on the downstream side of the fuel cell stack, thereby making it possible to have the desired pressure in the fuel cell stack, can be seen. This pressure regulating valve 122b makes it possible, in combination with the shut-off valve 128, to isolate the oxidant circuit from the atmospheric air during and after extinction.

Description of the Extinction Procedure

The procedure described below makes it possible to extinguish the fuel cell stack so as to guarantee storage with a hydrogen/nitrogen mixture therein, without requiring a nitrogen tank.

The shut-down procedure is essentially made up of 3 phases, resulting from various commands that are explained:
  $1^{st}$ phase: residual oxygen consumption phase, which occurs upon cutting off the fuel gas supply and oxidant gas supply, and by drawing a current $I_s$ at the terminals of the fuel cell stack. This current draw $I_s$ is maintained as long as an appropriate indicator indicates that the oxidant gas in the oxidant gas supply system has not been sufficiently consumed. An appropriate indicator is for example the voltage across the terminals of the fuel cell stack;
  $2^{nd}$ phase: neutralization phase that occurs when filling the cathode circuit with nitrogen. In the embodiment described here, the nitrogen is that of the atmospheric air. Forced injection of atmospheric air then takes place, thereby again introducing a little oxygen, the consumption of which must be controlled by the current draw; and
  $3^{rd}$ phase, which is optional, during which, after the electrochemical processes have been completed shut down, any excess fuel gas is forcibly removed (here, forced suction of the excess hydrogen). It should be emphasized that, by virtue of the invention, this suction takes place only after the fuel cell stack has been brought into a state in which the precautions for avoiding insufficient supply of hydrogen, the serious consequences of which are known, have been taken.

Figure 3:
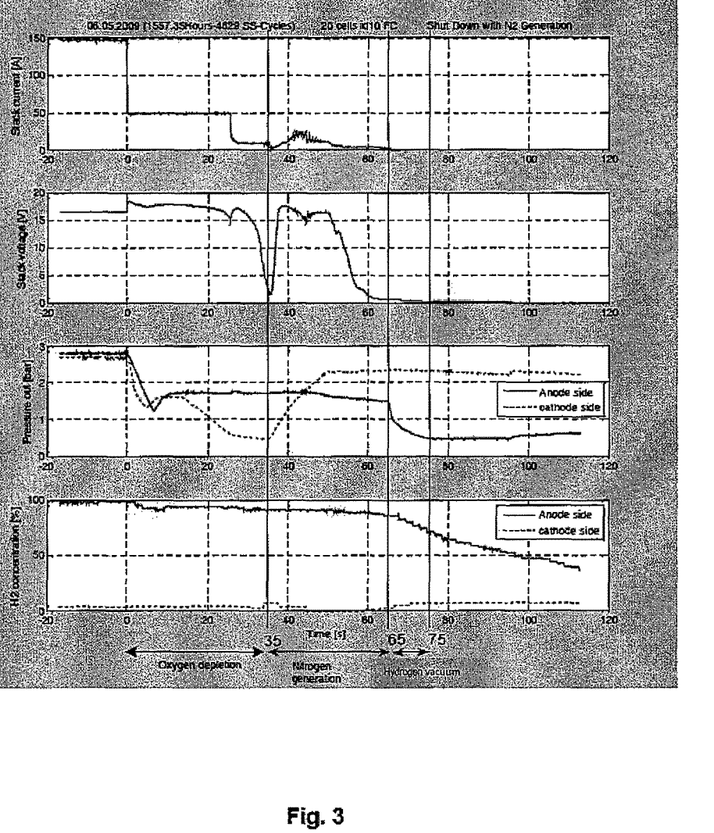
FIGS. 3 and 4 show the behaviour of various parameters during the extinction of a fuel cell stack according to an embodiment of the invention.

FIG. 3 illustrates the sequence of the three phases during a shut-down actually measured on a fuel cell stack comprising twenty cells having an active area of 300 cm$^2$, operating with pure oxygen. The x-axis indicates the time in seconds, with as reference (0) the instant when the shut-down procedure starts. This figure shows the variation of the following quantities as a function of time during a shut-down with nitrogen generation:
  Curve 1, the y-axis of which is labelled "stack current [A]", showing the current drawn from the fuel cell stack, expressed in amps;
  Curve 2, the y-axis of which is labelled "stack voltage [V]", showing the total electrical voltage across the terminals of the fuel cell stack, expressed in volts;
  Curve 3, the y-axis of which is labelled "pressure out [bar]", showing the pressure within the anode compartment (hydrogen: solid line) and in the cathode compartment (oxygen: dotted line), expressed in bara; and
  Curve 4, the y-axis of which is labelled "H2 concentration [%]", showing the hydrogen concentration in the anode compartment (hydrogen: solid line) and in the cathode compartment (oxygen: dotted line), expressed in vol %.

During the first phase of the extinction (0 to 35 s, marked "oxygen depletion" in FIG. 2), starting from the moment when the oxygen supply is cut off (by closing the cut-off valve 120 at the same instant that the cut-off valve 110 is closed, cutting off the hydrogen supply), the residual pure oxygen in the fuel cell stack is first partially vented to atmosphere via the momentary opening of the purge valve 122, and then the rest is consumed by drawing a current $I_s$. The purge valve 122 remains closed during the rest of the extinction procedure and also during rest, so as to prevent air from penetrating the cathode.

Figure 5:
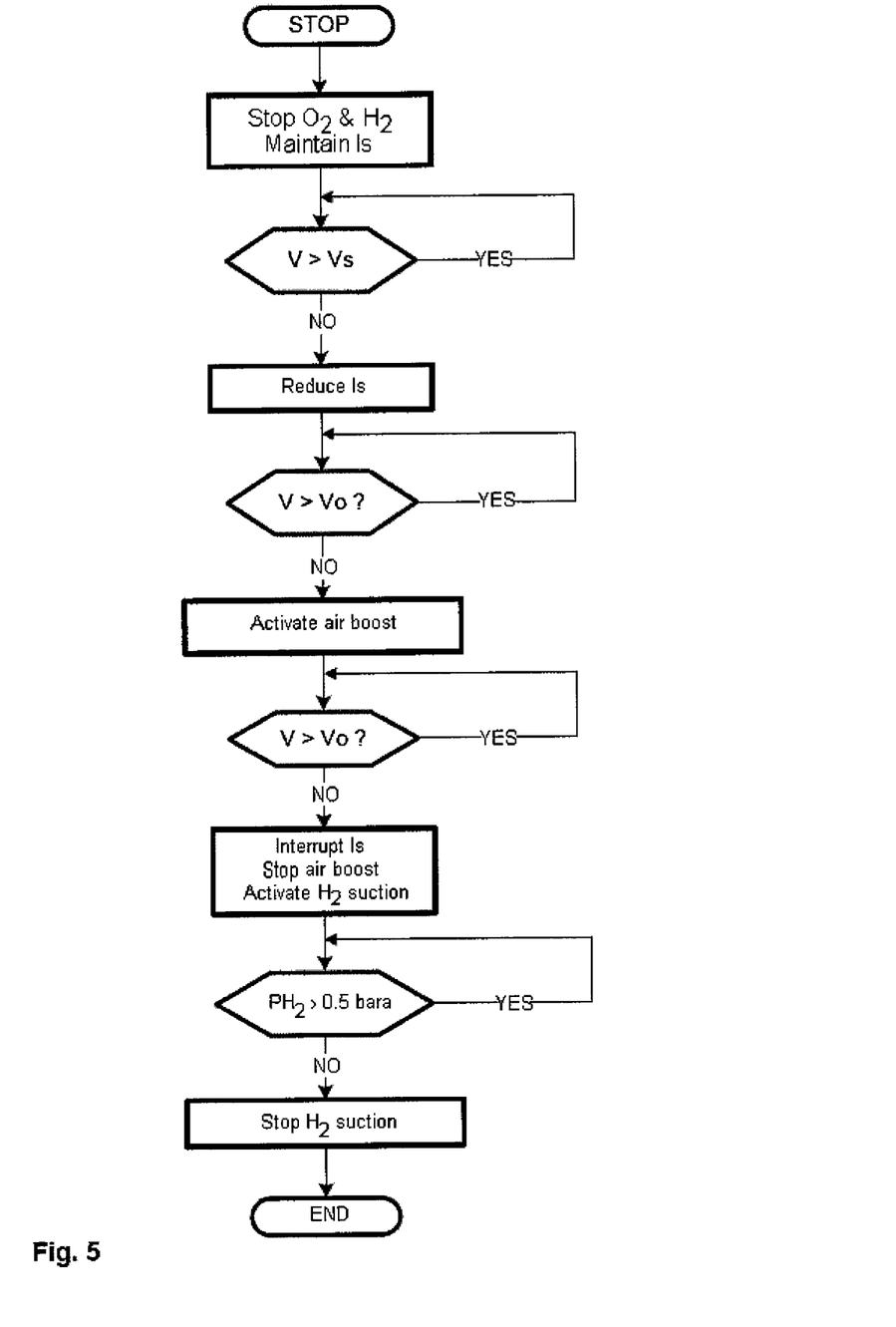
FIG. 5 shows a flowchart of the procedure for shutting down a fuel cell stack according to an embodiment of the invention.

FIG. 5 shows schematically the essential commands of the shut-down procedure according to the invention. It can be seen that, after an order to shut down the fuel cell stack (STOP instruction), an automatic fuel cell stack controller starts the shut-down procedure by cutting off the supply of gases, that is to say by closing, for example simultaneously, the cut-off valves 110 and 120 and the cut-off valve 128 (for the fuel cell stack illustrated in FIG. 1) or by closing, for example simultaneously, the cut-off valves 110 and 128 (for the fuel cell stack illustrated in FIG. 2).

As the first curve indicates, this current $I_s$ is firstly established at 50 A. From the moment that the voltage V of the fuel cell stack drops below an experimentally chosen threshold value $V_s$ (after about 25 seconds), the controller progressively reduces the current $I_s$ at the same time the fuel cell stack start to drop in voltage.

The third curve of FIG. 3 indicates that the pressure in the oxygen compartment drops to less than 500 mbara (as is usual in the field of fuel cell stacks, "mbara" means "millibar absolute", the final letter "a" denoting "absolute"). However, despite the consumption associated with current production, the hydrogen pressure remains at 1.75 bara because of the presence of the additional fuel gas accumulation chamber 116.

At the time 35 s ("35" on the time axis in FIG. 3), the cut-off valve 128 is opened at the same time as the air booster pump 129 is activated in order to pressurize the cathode circuit to a pressure of 2.2 bara (parameter 1), which is reached at 50 s. This sequence is shown schematically in FIG. 5, in which it may be seen that, as soon as the fuel cell stack voltage is no longer greater than $V_0$ (2 volts), the controller sends an "Activate air boost" order. The oxygen thus supplied by the air causes the fuel cell stack voltage to rise again. A current continues to be drawn (FIG. 3 shows that the current drawn rises somewhat, concomitantly with the rise in voltage) until the voltage of the fuel cell stack again becomes zero.

The shut-down procedure according to the invention is advantageously controlled so that the current draw is firstly established at a first level and then reduced at the same time as certain cells of the fuel cell stack start to drop in voltage, and finally it becomes zero when the voltage of the fuel cell stack approaches 0 V. For this purpose, it is therefore necessary to equip the fuel cell stack with sensors and electrical connections necessary for individually monitoring the voltage of the cells making up the stack, at least certain cells of the fuel cell stack.

This sequence is shown schematically in FIG. 5 in which it may be seen that, as soon as and as long as the voltage of the fuel cell stack is again greater than 2 ($V_0$ being approximately 2 volts), the controller maintains the current $I_s$ being drawn and, by virtue of the signals delivered by the pressure probe 121 and by virtue of appropriate circuits, the controller controls the operation of the air booster pump 129 in order to keep a substantially constant pressure in the oxidant gas supply circuit.

Incidentally, it should be reminded that all the curves detailed below, and shown in FIGS. 3 and 4, relate to the procedure for shutting down a fuel cell stack supplied with pure oxygen as oxidant, the nitrogen-enriched gas being the atmospheric air. However, it should be pointed out that, on the one hand, the nitrogen-enriched gas could be pure nitrogen and that, of course, in this case, the curves would have a different appearance after the instant "35 seconds" since the nitrogen injection would not be accompanied by a new supply of oxygen.

Let us return to the case described, namely the case of a fuel cell stack supplied with pure oxygen as oxidant. As the current is being consumed, the air present at the cathode becomes increasingly depleted in oxygen before finally containing only predominantly nitrogen, as revealed by the voltage across the terminals of the fuel cell stack becoming zero at the 65 second instant.

At this moment (65 seconds after the oxygen and hydrogen supplies have been cut off), the air booster pump 129 is stopped and the hydrogen suction pump 119 is activated at the same time as the cut-off valve 118 is opened, so as to remove the excess hydrogen. The suction pump 119 remains activated until the hydrogen pressure reaches 0.5 bara (parameter 2). This pressure is reached at the 75 second instant.

This sequence is shown schematically in FIG. 5 in which it may be seen that, as soon as the voltage of the fuel cell stack is no longer greater than 2 V, the controller sends a "Stop air boost", "Interrupt $I_s$" and "Activate $H_2$ suction" order, whereas the pressure is monitored by virtue of the signals delivered by the pressure probe 111 and, from the moment when the pressure of the anode circuit of the fuel cell stack is no longer greater than 0.5 bara, the controller sends a "Stop $H_2$ suction" order.

The procedure is then terminated, the booster pump 129 and the suction pump 119 are stopped and the cut-off valves 118 and 128 are closed so that the anode and cathode circuits are isolated from the ambient air.

Throughout the entire extinction procedure, the recirculating pump 125 on the cathode side is kept in operation so as to ensure good homogeneity of the gas and to ensure complete consumption of the oxygen, preventing the appearance of zones with a higher oxygen concentration locally.

The recirculating pump 115 on the anode side is also kept in operation so as to avoid any local hydrogen starvation. Throughout the extinction period, hydrogen starvation is avoided as the hydrogen consumption shown by the fourth curve indicates. The concentration remains above 85% in the anode circuit until the 65 second instant, when the hydrogen suction starts.

Figure 4:
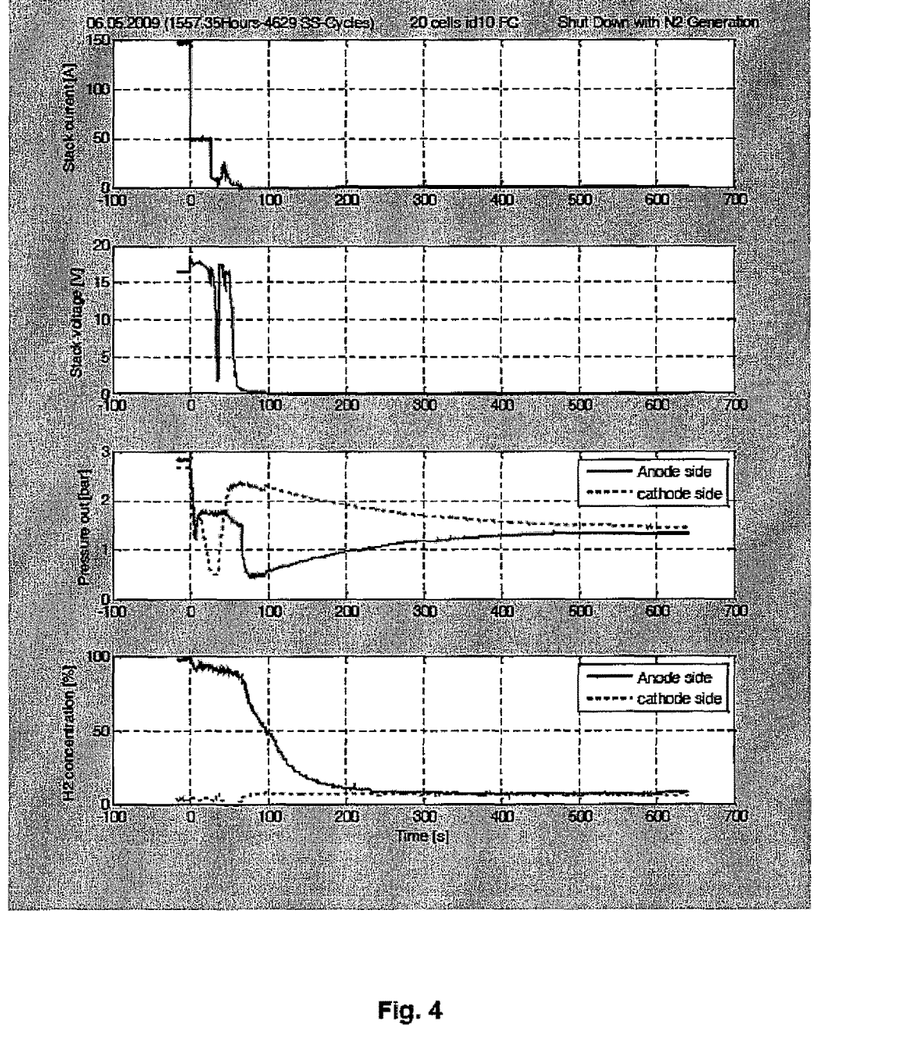

As indicated in FIG. 4, which shows the same shut-down, on a different time scale, allowing the parameters to be monitored over a longer period, at the end of the shut-down procedure and after the pressures and concentrations have been balanced by natural permeation through the membranes, the hydrogen concentration stabilizes to about 10% on either side of the membrane. By deduction, the two compartments of the fuel cell stack are therefore finally filled with a 10% hydrogen/90% nitrogen mixture, thereby guaranteeing the fuel cell stack is in a rest phase under suitable durability conditions and safety conditions therefor.

It should also be noted that the pressures equilibrate at around 1.5 bara, thereby guaranteeing a slight overpressure relative to the atmospheric pressure, even after cooling, so as to minimize the slow penetration of air into the fuel cell stack. The final concentrations and pressures indicated above result from adjusting the two parameters, namely air filling pressure of the cathode and final hydrogen suction pressure. Other settings of these two parameters are of course possible.

In the procedure described above, the first two phases (residual oxygen consumption and nitrogen injection) take place in succession. However, they could just as well be concomitant. For greater rapidity of extinction, it is desirable to make them occur simultaneously. The final phase (excess hydrogen suction) is not always essential. The hydrogen buffer tank may in fact be designed so that the procedure terminates with the desired amount of hydrogen as explained below.

The internal volume of the fuel gas supply circuit 11 is designed to be greater than the internal volume of the oxidant gas supply circuit 12 and, in normal operation, the pressure within the oxidant gas supply circuit 12 and the pressure within the fuel gas supply circuit 11 are such that, given the internal volume of the oxidant gas supply circuit 12 and the internal volume of the fuel gas supply circuit 11, the number of moles of fuel gas always available at the start of the extinction process in the fuel gas supply circuit is greater than or equal to twice the number of moles of oxygen consumed in the oxidant gas supply circuit during the entire extinction procedure, that is to say until the cathode circuit is essentially filled with nitrogen at the desired pressure.

Thus, in a simple adaptation to be calculated and implemented, it is possible to ensure that the fuel gas supply circuit always contains sufficient gas for the extinction of the fuel cell stack to result from the oxygen in the oxidant gas supply circuit being exhausted.

Let us see how to calculate the volumes of the anode circuit 12 and the cathode circuit 11. Let $m_{o2}$ be the amount of oxygen, expressed for example in moles, that has to be completely consumed over the entire extinction. This is the residual oxygen in the cathode circuit at the start of extinction less the amount that it is possible to purge, plus the amount which is introduced with the air introduced by the booster pump 129 to generate the nitrogen.

Since the gas consumption is twice as high on the hydrogen side, the volumes of the anode and cathode circuits must be sized so as to guarantee that:

$$m_{h2} \geq 2 \times m_{o2} + \text{res}_{h2}$$

where $m_{h2}$ is the amount of hydrogen, expressed in moles, available at the start of extinction in the internal volume of the fuel gas supply circuit (pipes, channels, bipolar plates, supply line downstream of the cut-off valve 110) and $res_{h2}$ is the desired amount of residual hydrogen, also expressed in moles. The amount of hydrogen $m_{h2}$ finally necessary will be obtained by adjusting the volume of the additional fuel gas accumulation chamber 116.

The amounts $m_{o2}$ and $m_{h2}$ are admittedly linked to the volume of the corresponding circuits that it is necessary to dimension, but they also depend on the pressure prevailing therein. This is a simplified approach since it would normally be necessary also to take account of the temperature of the gas and the nonlinearity of the hydrogen density as a function of the pressure. However, taking the pressure into account proves to be sufficient for the desired precision. The volumes have to be calculated for the most unfavourable pressure and temperature conditions that may be encountered, that is to say the minimum possible pressure in the hydrogen circuit at the start of extinction and the maximum possible residual pressure in the oxygen circuit.

However, in the case of a supply pressure variation, the execution of the procedure with an excess of hydrogen and a final suction guarantees that there is no hydrogen starvation and also better reproducibility of the final conditions.

It should be pointed out that, according to this invention, the nitrogen results from the depletion of the air, the oxygen content of which has reacted in the fuel cell stack according to the normal current production reaction without abnormal heat generation or any risk of degrading the catalytic components (as opposed to the patent U.S. Pat. No. 6,939,633).

At the end (75 seconds after the oxygen supply (120) and hydrogen supply (110) have been cut off) of the shut-down procedure, there remains a pressure difference between the anode and the cathode, in the example above 2.2 bara at the cathode and 0.5 bara at the anode. The time needed for the pressures to equilibrate may advantageously give an indication of the permeability of the membranes. The permeability of the membranes is indeed a parameter highly indicative of the state of health of a fuel cell stack. Furthermore, the undetected appearance of holes in the membranes also compromises safety. Therefore, permanent monitoring of their permeability is also useful for safety purposes.

For example, after each shut-down, as soon as the pressure difference drops to 500 mbar, the unit for controlling the fuel cell stack measures the variation in pressure over the following 60 seconds. The value obtained changes with the ageing of the fuel cell stack and constitutes an excellent indicator.

Although the principle of measuring the permeability by pressure difference is conventional, it does however require a dedicated manual procedure and dedicated apparatus (for example an external nitrogen bottle). In contrast, the invention offers the possibility of being able to measure the permeability automatically, after each extinction, this being a considerable advantage for monitoring and diagnosing a fuel cell stack.

Thus, according to another aspect, the invention provides a procedure for detecting the state of permeability of the polymeric ion-exchange membrane of a fuel cell stack. In this context, patent application US 2004/124843 already teaches a method for determining the individual permeability of each ion-exchange membrane of a fuel cell stack. To do so, the anode is supplied with hydrogen and the cathode is supplied with nitrogen or with another inert gas. According to the Nernst's equation, the difference in nature of the gas on either side of the membrane generates a potential difference that depends inter alia on the nature and the concentration or partial pressure of these gases. It appears that if a membrane is particularly permeable, the hydrogen will diffuse on the cathode side, and vice versa, thus modifying the nature of the gas mixture on either side of the membrane and consequently also modifying the potential difference measured on this cell. The method entails a voltage measurement, a measurement of the pressure within the anode circuit and of the pressure within the cathode circuit and a temperature measurement in order to solve the Nernst's equation, so as to detect whether one or more membranes mounted within a fuel cell stack have a permeability defect.

However, this method suffers from the following implementation difficulties:

the theoretical potential difference with pure hydrogen at the anode and pure nitrogen at the cathode is at most a few tens of mV, which implies a very accurate voltage measurement apparatus;

determination of the permeability involves flow rate measurements, which in practice are difficult to carry out with great precision for gas mixtures;

the slightest trace of residual oxygen at the cathode may generate a voltage difference much higher than the expected voltage level and therefore falsify the measurement, yet it is well known that in practice it is very difficult to guarantee complete disappearance of a gas, most particularly in the presence of an absorbent support such as the GDL (gas diffusion layer) contained in a membrane electrode assembly (MEA); and finally, this method involves a particular way of conditioning the system and requires a source of nitrogen or another inert gas being available. The method is therefore difficult to automate, most particularly in the context of onboard applications.

The procedure for detecting the state of permeability of the polymeric ion-exchange membrane of a fuel cell stack, according to the invention, the fuel cell stack being formed by a stack of electrochemical cells each having an anode and a cathode on either side of a polymeric ion-exchange membrane, the fuel cell stack having a fuel gas supply system on the anode side of the electrochemical cells and an oxidant gas supply system on the cathode side of the electrochemical cells, the procedure consisting, after each shut-down of the fuel cell stack, in measuring the rate at which the pressure within the anode circuit and the pressure within the cathode circuit come to equilibrium and, as soon as the pressure difference in the anode and cathode circuits drops to a value below a threshold value $P_s$, in measuring the variation in pressure in said circuits over a predetermined time period $t_c$, in storing the value of the pressure difference in these circuits at the end of a predetermined time period, called the control pressure $P_c$, and in giving a warning when the control pressure $P_c$ is below a warning threshold $P_A$.

Referring to FIG. 4, and more particularly to the curve showing the variation in the pressures on the anode side and cathode side, the difference between these curves gives a direct measurement of the pressure difference between these two circuits. It may be seen that a threshold value $P_s$ of 500 mbar is reached after a time of about 300 seconds. Next, the pressure difference at the end of an additional time period $t_c$, for example a time of 60 seconds, is systematically recorded, that is to say at each shut-down of the fuel cell stack, thereby giving in this example, that is to say for the fuel cell stack used to record the curves of FIGS. 3 and 4, a control pressure $P_c$ of 360 mbar, that is to say a drop in the pressure difference at the anode and cathode circuits of 140 mbar. It therefore suffices to set up an experimental design for correlating the control pressure values $P_c$ at the end of a predetermined time period $t_c$ with the degradation of the ion-exchange membrane, thereby enabling fuel cell ageing to be automatically monitored.

A hydrogen concentration sensor C11 may advantageously be inserted into the anode circuit so as to check there is no hydrogen starvation during the extinction procedure and, where appropriate, to limit the injection of air by the booster pump, which may occur for example if the hydrogen pressure is abnormally low and does not ensure the sufficient amount of hydrogen for completing the extinction procedure without risk of hydrogen starvation. Such a hydrogen sensor C11 is installed as shown in FIGS. 1 and 2 and is described more particularly below and illustrated by means of FIG. 6.

Figure 6:
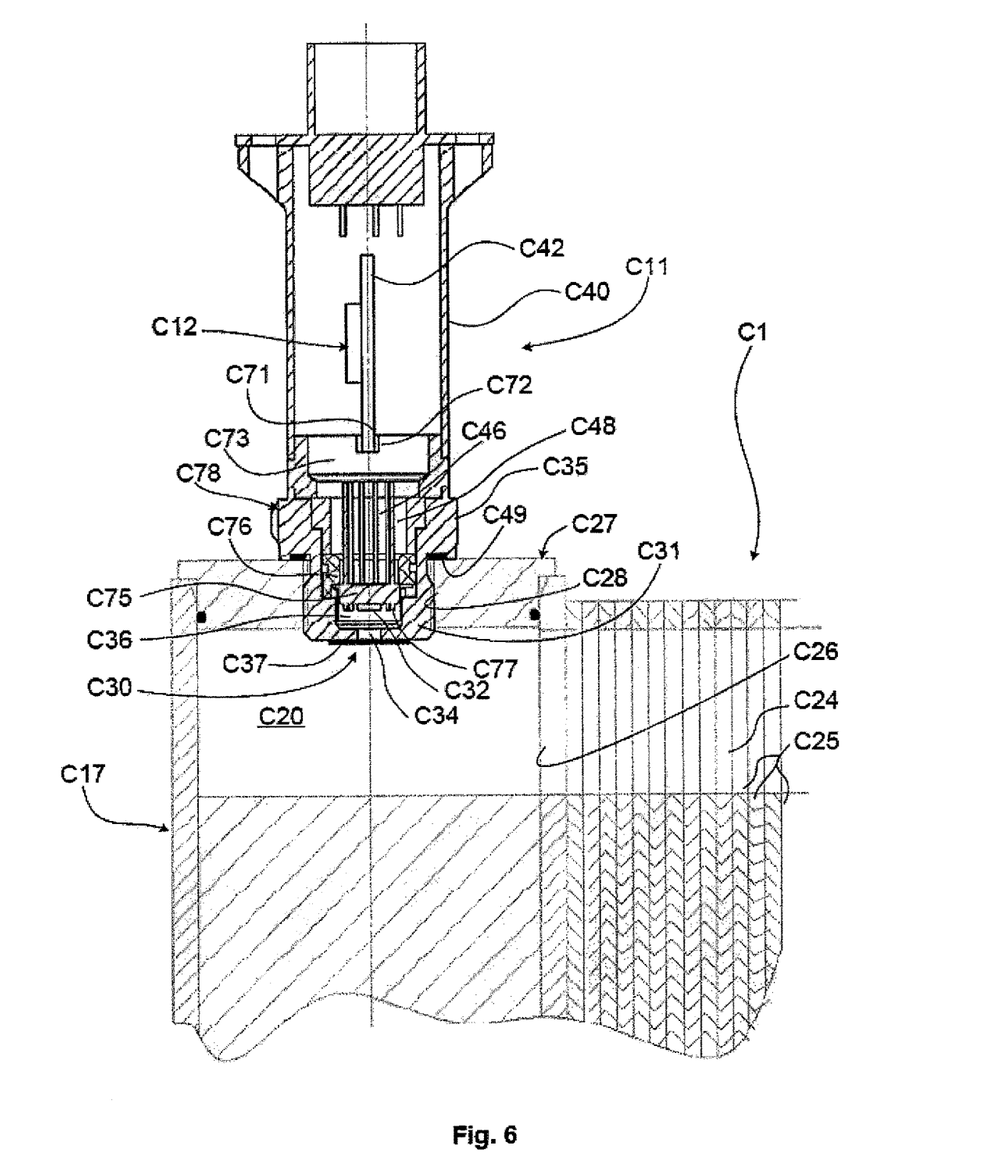
FIG. 6 is a sectional view of the mounting of one of the sensors penetrating the enclosure of the fuel cell stack through the wall of an end plate of the electrochemical reactor.

FIG. 6 shows a hydrogen intake chamber C20 provided in an end plate C17 and adjacent to a cell stack C25, in which cells the electrochemical reaction of a fuel cell stack C1 takes place. The adjacent cells are traversed by a duct C24 for supplying hydrogen gas, which is sourced in the chamber C20 via an inlet C26.

A hydrogen concentration sensor C11 based on measuring thermal conductivity is mounted on the upper lateral face C27 of the system plate C17, more precisely mounted in a drillhole C28 through which a hollow end-piece C31 passes with appropriate sealing with respect to the pressurized gas, formed by a seal C49, in which end-piece the sensitive unit C30 of the hydrogen concentration sensor C11 is housed and protected. The head of the sensitive unit C30 comprises a wafer C32 of sensitive circuits, which is mounted in a chamber C36 provided in the lower portion of the end-piece C31. The chamber C36 communicates with the chamber C20 in the fuel cell stack via a channel C34 drilled in the end wall of the hollow end-piece C31. The wafer C32, one face of which is turned toward the outlet of the channel C34 in the chamber C36, is in direct contact with the atmosphere in the chamber C20 via the channel C34. In accordance with an important aspect, a filter C37 is placed on the inlet of the channel C34 in the chamber C36 in order to isolate the wafer C32 from any contact with liquid water that could be mixed with the gases of the chamber C20. The filter C37 is made of a material which is permeable to the gases but impermeable to liquid water. The commercially available woven material with the brand name "GORETEX®" is known for example for its capability in such a use. This essentially consists of a synthetic fabric of Teflon® yarns.

On the opposite side from the hollow end-piece C31, the casing of the hydrogen concentration sensor C11 comprises a cylindrical sleeve C48 that projects from the external lateral wall C27 of the plate C17, by means of a thrust flange C35 fixed in this wall C27, and is itself extended by a tubular shell C40. The processing unit C12 responsible for producing the hydrogen concentration information on the basis of the thermal conductivity measurement is formed by a circuit mounted on a printed circuit board C42, the contact pins of which at an end C71 are plugged into a connector C72 in a connection housing C78 mounted on a support C73 inside the cylindrical sleeve C48. A set of electrical conductors C46 connected at one end in the connection housing C78 pass through the interior of the cylindrical sleeve C48 and the hollow interior of the flange C35 so as to terminate in an insulating partitioning plug or housing C75 that closes off the upper portion of the chamber C36 at the end of the end-piece of the sensor C31. In addition, each conductor C46 is electrically connected through this housing C75 to a respective contact pad C77 formed on the lower face of the housing in the chamber C36. Also bonded to this lower face is the wafer C32 of the sensitive unit C30 of the sensor, with its sensitive face turned toward the chamber C36.

The plug C75 is sealingly fixed to the inside of a sleeve C76 inside the hollow end-piece C31 so as to be able to withstand the pressure of the gas in the chamber C36, knowing that, on its upper face, it is subjected to the ambient pressure in the space where the fuel cell stack is installed. The electrical conductors C46 pass through the plug C75 in glass beads so as to avoid impairing the sealing thereof so that the gas contained in the chamber C20 does not escape.

Provided with all these precautions, the hydrogen concentration sensor C11, with its sensitive unit C30 around the wafer C32 and the processing unit C12, is operational for carrying out in situ measurements of physical parameters characterizing the properties of the gas contained in the chamber C20 and especially its hydrogen content, which is a parameter of paramount importance for the operation of the fuel cell stack. It turns out that carrying out in situ measurements continuously or almost continuously inside an electrochemical reactor is made operationally feasible by integrating into the reactor a sensor sensitive to the thermal conductivity of the gas in which its sensitive head C30 is immersed. Measurement of this parameter proves to be particularly suitable for detecting hydrogen contents in the atmosphere of an electrochemical reactor such as a fuel cell. It is known in fact that the thermal conductivity of hydrogen is the highest in nature as regards gases. This property makes it easier to detect hydrogen among other gases, especially oxygen and nitrogen with which it is liable to be mixed in the fuel cell stack. It will be recalled that, to take this type of measurement, the sensor includes a wafer of material which is heated, for example by means of a resistor through which an electrical current flows. By measuring the electrical power devoted to maintaining a defined temperature, it is possible to determine the power dissipated by the loss of heat in the atmosphere in which the wafer is immersed and to deduce therefrom the thermal conductivity of the ambient gas mixture.

According to another aspect, a gas content sensor, such as C11 described above, is used in the fuel cell stack to maintain the integrity of the system during extinction and during the rest or storage period that follows. Specifically, the control unit of the fuel cell stack is programmed to continue monitoring the hydrogen content of the fuel gas circuit based on commanded periodic measurements by the hydrogen concentration sensor C11 and to verify that hydrogen is always present.

The applicant has been able to determine that a thermal conductivity sensor such as C11 also lends itself very well to detecting a relatively low concentration threshold (a few percent) to be respected in the hydrogen circuit of the fuel cell stack in order to prevent the environment of the oxidation-sensitive elements from coming into hydrogen starvation over the period of the extinction phase of the fuel cell stack or subsequently during rest periods. To prevent this condition, the extinction procedure may advantageously be carried out on the basis of the hydrogen concentration information delivered by the hydrogen concentration sensor C11. During the rest phase that follows it, the hydrogen concentration sensor C11 is periodically "woken" so as to carry out a measurement. For example, when the control unit detects the imminence of such a condition from the information delivered by the hydrogen concentration sensor C11, it causes the pressure regulating valve 117 to open so as to allow controlled discharge of some of the hydrogen contained in the accumulation chamber 116 in order to re-establish, to a programmed level, the amount of hydrogen in the fuel circuit of the reactor at extinction or in a storage state. Optionally, if the accumulation chamber is empty, the pure-hydrogen intake valve 110 is opened.

The extinction procedure described above leaves the fuel cell in a state for implementing, automatically and without any intrusion in the system, the membrane permeability measurement method described in patent application US 2004/124843. The invention therefore extends to the extinction procedure described above followed by a measurement of individual permeability of each of the ion-exchange membranes, consisting in measuring the individual voltage of each of the cells of the fuel cell stack, recording the rate at which each of the individual voltages changes and, when said rate has preidentified characteristic signs, activating a warning signal indicating that the fuel cell stack requires inspection.

It will be recalled that the method described in patent application US 2004/124843 proposes inundating the anode circuit of a fuel cell stack with hydrogen and the cathode circuit with an inert gas. This difference in the nature of the gases produces, according to the Nernst's equation, a potential difference that depends on the pressure and on the temperature. The excessive permeability of a membrane prompts gas exchange between the anode and the cathode, thus modifying the nature of the gas mixture on either side of the membrane and resulting in a modification in the measured potential difference. The individual permeability of the membranes may therefore be determined on the basis of a voltage measurement.

Measuring the individual voltage of the cells of a fuel cell stack is a conventional means called CVM (cell voltage monitoring) used to record the voltage of the individual cells or of a group of several cells during the normal operation of a fuel cell stack. The pressure and temperature measurements are also necessary for the normal operation of a fuel cell stack.

It is apparent that the extinction procedure described in the present patent application automatically produces the other conditions necessary for carrying out the membrane permeability measurement method described in patent application US 2004/124843, namely the presence of hydrogen at the anode and the presence of an inert gas at the cathode, i.e. nitrogen. This occurs at each extinction and with no intrusion in the system and no requirement for an additional tank, this being an advantage, most particularly for mobile applications.

Another advantage of the extinction procedure described in this document is that it results by nature in complete consumption of the residual oxygen by electrochemical reaction, thereby ensuring that oxygen is absent at the cathode. However one of the drawbacks identified above with the method described in patent application US 2004/124843 is indeed its sensitivity to the slightest trace of residual oxygen, which could completely falsify the permeability measurement.

It is therefore proposed here to carry out an individual permeability measurement using the method described in patent application US 2004/124843 automatically after each extinction procedure according to the extinction procedure described in this document.

Patent application US 2004/124843 recommends a continuous stream of hydrogen at the anode and of inert gas at the cathode, although the extinction procedure described in that document leaves the cell stack with a limited amount of these two gases imprisoned at the end of extinction in the closed anode and cathode circuits. As a result, it will be necessary to take account of the dynamics of the potential difference measurement rather than its final value, which necessarily tends towards 0 when the gas mixture of the two chambers is homogenized after a few minutes because of the natural permeability of the membranes. This is not a drawback for evaluating the individual permeability of the membranes, on the contrary it makes it possible to dispense with the gas flow rate measurement. Furthermore, it is more economical in terms of gas consumption.

The invention claimed is:

1. A procedure for shutting down a fuel cell stack, the fuel cell stack being formed by a stack of electrochemical cells each having an anode and a cathode, said anode and said cathode being arranged on respective sides of a polymeric ion-exchange membrane, the fuel cell stack having a fuel gas supply system on the anode side of the electrochemical cells supplying pure hydrogen gas as the fuel gas and an oxidant gas supply system on the cathode side of the electrochemical cells, the fuel cell stack delivering an electrical voltage to an electrical power line, the shut-down procedure comprising the following actions:
   (i) simultaneously cutting off the supply of fuel gas and oxidant gas;
   (ii) continuing to draw current as long as the oxidant gas in the oxidant gas supply system has not been consumed;
   (iii) injecting nitrogen-enriched gas into the oxidant gas supply system, after actions (i) and (ii);
   (iv) stopping the injection of the nitrogen-enriched gas; and
   (v) forcibly removing excess fuel gas, after action (iv).

2. The shut-down procedure according to claim 1, wherein the fuel cell stack is supplied with pure oxygen as oxidant, and the nitrogen-enriched gas is atmospheric air.

3. The shut-down procedure according to claim 1, comprising stopping injection of nitrogen-enriched gas into the oxidant gas supply system when the voltage of the fuel cell stack is 0 V.

4. The shut-down procedure according to claim 1, followed by a measurement of individual permeability of the ion-exchange membrane, the measurement comprising measuring the individual voltage of each of the cells of the fuel cell stack, recording the rate at which each of the individual voltages changes and, when said rate has pre-identified characteristic signs, activating a warning signal indicating that the fuel cell stack requires inspection.

5. The method of claim 1, comprising forcibly removing the excess fuel by suction.

\* \* \* \* \*